Oct. 6, 1931.   W. F. STOODY ET AL   1,825,829
WELDING ROD
Filed Nov. 13, 1929

INVENTORS
W. F. STOODY
S. M. STOODY
BY Hazard and Miller
ATTORNEYS

Patented Oct. 6, 1931

1,825,829

UNITED STATES PATENT OFFICE

WINSTON F. STOODY AND SHELLEY M. STOODY, OF WHITTIER, CALIFORNIA, ASSIGNORS TO STOODY COMPANY, OF WHITTIER, CALIFORNIA, A CORPORATION OF CALIFORNIA

WELDING ROD

Application filed November 13, 1929. Serial No. 406,868.

This invention relates to welding rods and to a method of protectively facing tools, in which method the improved welding rod may be suitably employed. It may be considered as a further development of the subject matter disclosed in our copending application Serial No. 250,697, filed January 30, 1920, entitled Welding rods.

In our copending application we have disclosed a welding rod consisting of fragments of an alloy containing tungsten and carbon associated together and held in rod like form by a metallic sheath or tube containing iron. These fragments are relatively large in size and when the welding rod is used the sheath containing the iron melts on the surface to be protected, simultaneously depositing fragments of the carbide. On cooling, the sheath cools about the fragments anchoring them in place, thus forming a protective facing. The fragments used therein are of such size that when the welding rod is used in welding with an acetylene torch that we have never been able to discover any alloying or solution of the carbide fragments with the metal of the sheath or tubing. Even under an electric arc the alloying or dissolving of the carbide fragments with the metal of the sheath is hardly perceptible, although under a prolonged arc it appears that there is a slight breaking down of the fragments which may partially dissolve in the iron of the sheath.

We have discovered that if the fragments of the carbide are reduced in size so that they are comparatively quite small, that by virtue of the small size a perceptible percentage of the particles of carbide will dissolve in the molten iron and alloy therewith. This percentage of the particles is a material percentage but at the same time all of the particles do not dissolve in the iron or form an alloy therewith. Instead the remainder seem to remain in an unaltered condition.

It is, therefore, an object of this invention to provide an improved welding rod which consists of an association of a metal containing iron and particles of tungsten and carbon, which are combined in an alloy, and which are of such small size that the particles will have a certain percentage alloy with the iron, forming a tungsten-carbon-iron-alloy on the tool to be protected which embeds remaining particles and anchors them in place.

Another object of the invention is to provide a method of protectively facing tools, which embodies associating together iron, tungsten and carbon, wherein the tungsten and carbon are in the form of tungsten carbide particles sufficiently small in size that a perceptible percentage of them may and will dissolve in an alloy with the iron while the iron is in a molten condition during welding.

With the foregoing and other objects in view, which will be made manifest in the following detailed description, and specifically pointed out in the appended claims, reference is had to the accompanying drawings for an illustrative embodiment of the invention, wherein:

Figures 1, 2:
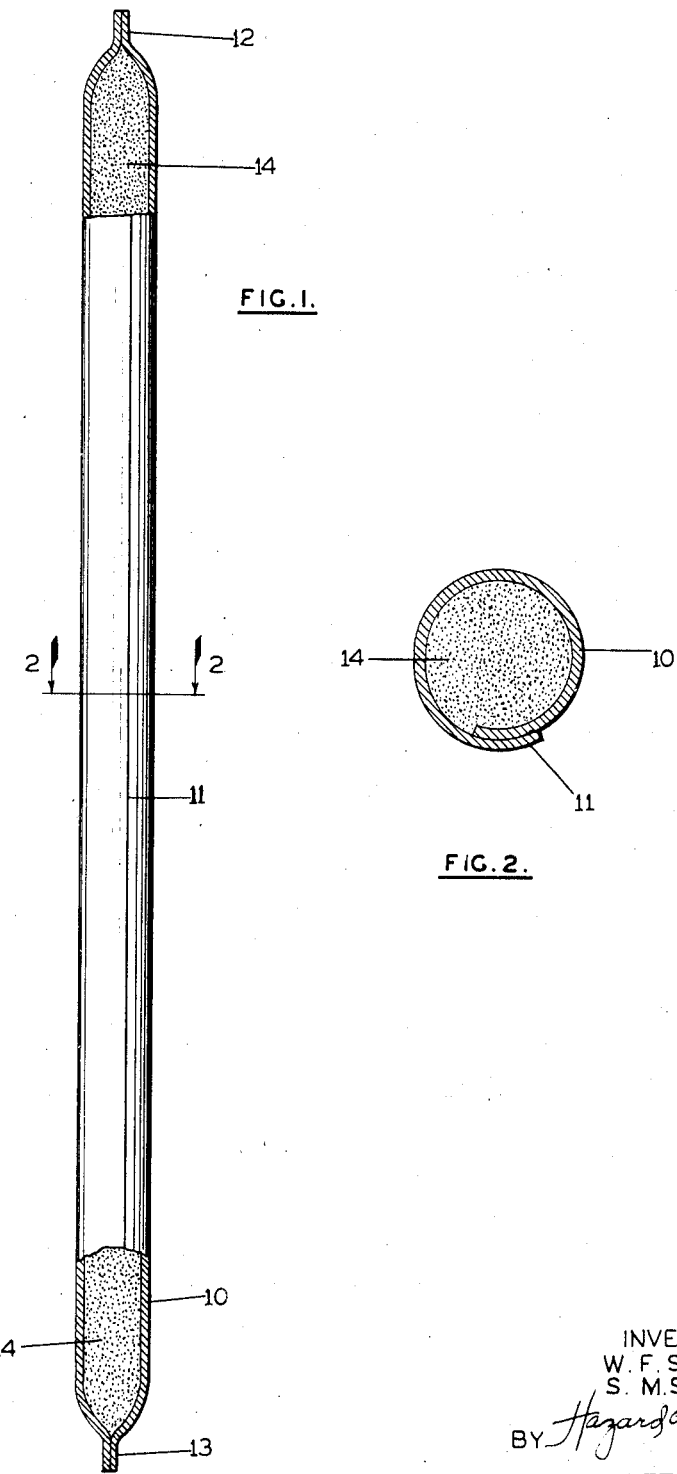
Fig. 1 is a view in side elevation, parts being broken away and shown in vertical section, illustrating a preferred form of the improved welding rod.
Fig. 2 is a horizontal section taken upon the line 2—2 upon Fig. 1.

Referring to the accompanying drawings, wherein similar reference characters designate similar parts throughout, the improved welding rod in its preferred form comprises a sheath 10, preferably formed of mild steel. This sheath is rolled up into tubular form with overlapping side edges, indicated at 11. The tubular sheath thus formed may have its top and bottom pinched together, as indicated at 12 and 13 respectively, thus forming an elongated tubular container of the size and shape which are suitable to enable the finished article to be used as a welding rod. Within the sheath there is a finely comminuted material containing tungsten and carbon. We prefer to have the tungsten and carbon in the form of an alloy forming a tungsten carbide. There are two known tungsten carbides, these having the formula $WC$ and $W_2C$ and we have reason to believe that there are possibly further tungsten carbides which may have the formula $W_3C$ and $W_4C$. Any tungsten carbide or material containing substantial amounts of tungsten and carbon closely associated together may be used for the filler indicated at 14. The tungsten carbon alloy is first prepared in a form of a fine powder and we have found that the particles should be such that the majority of them at least, if not all of them, should be of such size that they are capable of passing through a thirty mesh screen.

In utilizing the improved welding rod, the rod is handled and treated in a manner quite similar to a conventional welding rod, using either an oxy-acetylene torch or an electric arc. The sheath 10 melts and supplies the desired iron, being in the form of mild steel, and the filler 14 is simultaneously deposited with the molten sheath. In using an oxy-acetylene torch the molten iron obtained from the sheath seems to form an alloy with at least a substantial percentage of the filler 14, by virtue of the fact that the particles are of such small size. It is to be noted that the temperature capable of being developed by the acetylene torch and consequently the temperature of the molten iron are below the melting temperature of the carbide. Regardless of this fact, however, a certain percentage of the carbide seems to dissolve in the molten iron and alloy therewith. Not all of the carbide dissolves in the iron, however, and while the deposited rod is molten, it has the appearance of molten steel except for the fact that it has a granular appearance produced by those particles of carbide which do not dissolve in and enter into the iron in forming a tungsten-carbon-iron-alloy. In this manner a tungsten-carbon-iron-alloy is in place on the face to be protected and the particles of carbide which do not melt or dissolve in the iron will remain therein in a substantially unaltered condition and will be anchored in place by the tungsten-carbon-iron-alloy to the face to be protected.

We have found deposits to give readings of between 65 and 70 on the C scale of a Rockwell testing machine.

The alloy of iron, tungsten and carbon, which forms the matrix for the remaining tungsten carbide, anchoring these particles in place, is harder than hard steel, although it is no more brittle. It has a fine grain and has the appearance of a fine grade of tool steel, although it is harder than tool steel. Although the tungsten carbide particles which remain unaltered are harder than the tungsten-carbon-iron-alloy, we find that when the deposited mass is subjected to abrasion it appears to wear evenly, as distinguished from the deposit produced by the rod disclosed in our copending application, wherein the tungsten carbide particles are so large that when subjected to abrasion these fragments resist the abrasion while the mild steel wears away between the fragments.

In depositing the rod by means of an electric metallic arc process we find that the rod works very nicely, flows evenly, and appears to be in a somewhat more liquid state than where an acetylene torch is used. It does not have quite as granular an appearance, indicating that possibly more of the tungsten carbide particles alloy with the iron. However, after the deposit has cooled, it appears to have identically the same characteristics as that produced in using the rod with an oxy-acetylene torch.

The melting point of tungsten carbide being materially higher than that of mild steel, it seems peculiar that any particle of the tungsten carbide should be capable of dissolving or alloying with the mild steel sheath. We believe, however, that the action is probably analogous to what takes place when iron will be found alloying or dissolving in molten aluminum, which is molten at a temperature below that of iron.

While we have illustrated the preferred form of welding rod, it is obvious that the invention may take various forms and embodiments. Instead of using a wrapped mild steel sheath, seamless tubing may be employed or the particles may be held in rod like form in any other manner. We find that it is highly advantageous to include in the filler a small percentage of a deoxidizing agent, such as powdered aluminum, which will assist in eliminating gas bubbles in welding. Also under certain circumstances it may be found desirable to coat the rod with a material which will give off a reducing gas or atmosphere in welding, which will prevent or reduce oxidation. Sometimes a coating may be used which will form a slag in welding to prevent or reduce oxidation.

We also find that it is advantageous to incorporate in the filler a suitable binder, such as molasses or water glass which will bind the particles of the filler together to such an extent as to prevent their falling out of the sheath during welding while the rod is in vertical position.

A modified form of rod may be produced in the form of sticks of fine particles of iron and fine particles of tungsten carbide. These particles of iron and tungsten carbide may be extruded through a die, together with a binder such as molasses or the like, which will hold the mass together in a shape making it suitable for welding purposes.

We find that the best proportion of the tungsten carbide to the mild steel tape is obtained by taking a mild steel tape .020 of an inch thick and three-quarters of an inch wide. This is rolled into the cylindrical shape indicated on the drawings with a slight lap and filled with the tungsten carbide particles. The proportions thus gained give results which we have found to be most satisfactory and although the sizes may be changed, we find that approximately this ratio of tungsten carbide to mild steel should be preserved.

From the above described construction it will be appreciated that a novel, simple and advantageous welding rod is provided and a method of protectively facing tools is also provided, wherein a tungsten-carbon-iron-alloy is formed in place, anchoring in place particles of tungsten carbide which have not alloyed with the iron, forming an anchoring which is of fine grain, tough and very hard, in which there are embedded harder particles.

Various changes may be made in the details of construction without departing from the spirit or scope of the invention as defined by the appended claims.

We claim:

1. A welding rod comprising a plurality of particles of tungsten carbide, said particles being held in a form suitable for welding purposes by a material containing iron, the majority of said particles being capable of passing through a thirty mesh screen.

2. A welding rod comprising a tubular container formed of a metal having a relatively low melting point, and particles of tungsten carbide in the container, the majority of said particles being capable of passing through a thirty mesh screen.

3. A welding rod comprising a tubular container formed of mild steel, and particles of tungsten carbide in the container, the majority of said particles being capable of passing through a thirty mesh screen.

4. A welding rod comprising a tubular container formed of mild steel, said container being substantially filled with a powdered alloy containing tungsten and carbon, the powder being sufficiently fine that substantially all of the particles are capable of passing through a thirty mesh screen.

In testimony whereof we have signed our names to this specification.

WINSTON F. STOODY.
SHELLEY M. STOODY.